US008230799B2

(12) United States Patent
Ahmed

(10) Patent No.: US 8,230,799 B2
(45) Date of Patent: Jul. 31, 2012

(54) SHACKLE APPARATUS AND SYSTEM FOR THE LIFTING OF SUBSEA OBJECTS

(75) Inventor: Syed Ahmed, Katy, TX (US)

(73) Assignee: Rovsco, Inc., Houston, TX (US)

( * ) Notice: Subject to any disclaimer, the term of this patent is extended or adjusted under 35 U.S.C. 154(b) by 491 days.

(21) Appl. No.: 12/185,088

(22) Filed: Aug. 2, 2008

(65) Prior Publication Data
US 2010/0024377 A1 Feb. 4, 2010

(51) Int. Cl.
B63C 7/20 (2006.01)
B66C 1/42 (2006.01)
F16G 15/04 (2006.01)

(52) U.S. Cl. ............................................. 114/51; 59/86

(58) Field of Classification Search .................. 294/66.1; 114/50, 51; 280/515; 411/347, 341, 342; 59/86; 24/453
See application file for complete search history.

(56) References Cited

U.S. PATENT DOCUMENTS

| 79,801 | A | * | 7/1868 | Adams | 292/153 |
| 1,584,851 | A | * | 5/1926 | Crone | 411/22 |
| 4,059,041 | A | * | 11/1977 | Hassan | 411/342 |
| 2004/0052611 | A1 | * | 3/2004 | Liu | 411/508 |

FOREIGN PATENT DOCUMENTS

| GB | 2221277 A | * | 1/1990 |
| GB | 2399333 A | * | 9/2004 |
| JP | 63121595 A | * | 5/1988 |
| JP | 05280518 A | * | 10/1993 |
| JP | 08143267 A | * | 6/1996 |
| SU | 499175 A | * | 3/1976 |
| WO | WO 2007114574 A1 | * | 10/2007 |

* cited by examiner

Primary Examiner — Sunil Singh
(74) Attorney, Agent, or Firm — Egbert Law Offices PLLC

(57) ABSTRACT

The present invention is a shackle apparatus used for the lifting of subsea objects. The shackle apparatus includes a shackle body having a first leg and a second leg in which each of the legs has an eyelet formed therein. A pin is mounted through the eyelets of the legs of the shackle body. At least one latch extends radially outwardly of the pin and resides adjacent the first leg of the shackle body. A stop surface extends from the pin and is positioned adjacent the second leg of the shackle body. The pin has a generally pointed end so that a remotely operated vehicle can suitably guide the pin through the eyelets of the shackle body. A gripping member extends outwardly from an end of the pin so as to provide a surface whereby an ROV can grip the pin for installation into the shackle body.

4 Claims, 4 Drawing Sheets

SHACKLE APPARATUS AND SYSTEM FOR THE LIFTING OF SUBSEA OBJECTS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to shackles. More particularly, the present invention relates to shackles having installable pins. Additionally, the present invention relates to shackle apparatus whereby the pin of the shackle can be installed through eyelets of the legs of the shackle body by a remotely operated vehicle (ROV) for the purposes of lifting a subsea object.

2. Description of Related Art Including Information Disclosed Under 37 CFR 1.97 and 37 CFR 1.98

In the age of deep sea oil and gas exploration and drilling, it becomes increasingly necessary to install and to remove very large objects at a significant distance below the surface of the body of water. Various objects that are located below the surface of the water can include oil production trees, subsea platforms, pumping equipment and other apparatus. In the past, these types of devices have been relatively light so that the objects can be easily lifted to the surface of the body of water by a simple crane and hook assembly. The hook can engage a padeye or other connector on the object so that when a lifting force is applied to a line, the object can be raised to the surface.

At present, the requirements for subsea oil and gas production have increased significantly. Additionally, the depth at which drilling activities occur increases continuously. As a result, increasingly heavy objects are required to be placed on the ocean floor for use in the oil and gas drilling and production activities. As such, a need has developed for devices whereby very large objects can be securely transported to the surface of the body of water using lifting devices on a ship or other water-supported device.

Whenever subsea objects are located at a depth of greater than 400 feet, it becomes necessary for remotely operated vehicles (ROVs) to be utilized for carrying out the subsea activities. These remotely operated vehicles usually have at least one arm extending therefrom. These devices can be operated from the surface of a body of water and manipulated so as to properly carry out the subsea activities. In the circumstances where objects must be lifted from a depth of greater than 400 feet, an ROV must be employed so as to assist in the lifting operation. In the past, the arm of an ROV has been utilized so as to place a hook of a line from a crane into a padeye of a subsea object.

Typically, such hooks will only have a capacity of up to three hundred tons, and this lifting is not very secure. Various other mechanisms must be employed so as to provide for greater lifting forces. In particular, shackles have ratings of up to 400 tons. As such, shackles are a preferred method for securement to the subsea object for the purposes of securely lifting the object to the surface. Typically, a container that is positioned below the surface will have a number of padeyes located on a surface thereof. As such, shackles can be applied to separate padeyes so as to distribute the forces more evenly and reduce the load on each shackle. Shackles are well known in the prior art and are commonly utilized on surface activities.

Unfortunately, in the past, it has been difficult to utilize such shackles in the subsea environment. Whenever a shackle is utilized, a relatively complex system must be utilized so as to install the pin in the eyelets associated with each of the legs of the shackle. As such, a need has developed so as to provide such a pin which can be installed into the eyelets associated with the legs of the shackle by a remotely operated vehicle. Such an installation must be secure, reliable and relatively quick.

In the past, various patents have issued relating to shackles and subsea installations. For example, U.S. Pat. No. 4,476,673, issued on Oct. 16, 1984 to R. T. Brown, describes a shackle pin locking construction. In particular, this device utilizes a resilient clip that selectively engages portions of a loop-type shackle. A removable locking pin is secured thereto so as to prevent accidental dislodgement through a loosening of the pin. The clip may be engaged and disengaged without the use of tools. The clip is temporarily resiliently attached to the body of the shackle when not in use.

U.S. Pat. No. 4,705,331, issued on Nov. 10, 1987 to J. N. Britton, shows a self-actuating clamp for attachment to a structural member in a subsea environment. The clamp includes a housing having spaced side members, a transverse compression plate mounted between the members across the top of the housing and external accessory mounting surfaces. A pair of opposed, elongated jaw members have their upper portions disposed within the housing. A trigger assembly is provided for maintaining the jaw members in an open position while the clamp is properly positioned over the structural member.

U.S. Pat. No. 4,943,187, issued on Jul. 24, 1990 to H. P. Hopper, describes a system of ROV intervention on subsea equipment. In particular, a projecting actuation point and a hollow ROV-operable tool is provided a smaller diameter surface of the actuation point provides a coarse guidance and early alignment of the tool.

U.S. Pat. No. 6,023,927, issued on Feb. 15, 2000 to I. Epstein, shows a shackle with a kant loose pin. In particular, this shackle allows for the attachment of a cable or a chain or a rope to the shackle. The shackle has a clevis pin whereby operator can connect a cable or multiple cables to the shackle and clevis pin so as to reduce the number of operators. The spring urges a locking lever to lock the clevis pin and shackle together and to preclude the rotation of the clevis pin and shackle with respect to each other.

U.S. Pat. No. 6,402,428, issued on Jun. 11, 2002 to Morisi et al., describes a pipeline recovery tool. The rigged-up tool is lowered over the pipeline and engaged with the pipeline such that a fixed claw engages the collar on the pipeline. An ROV is used to cause a movable dog on the tool to engage the collar and then lock the fixed claw in position. The pipeline is then lifted to the surface by a lift arm on the first end of the tool.

U.S. Pat. No. 6,851,895, issued on Feb. 8, 2005 to Jarry et al., describes an improved mooring apparatus and method suitable for use with large offshore vessels. An anchor is fitted with a short chain with one end permanently connected thereto and its free end temporarily placed in a chain locator. The chain locator is positioned so as to be accessible after deployment of the anchor to the seabed. The anchor with a short chain is deployed to the seabed. At some stage, the free end of a mooring chain is lowered to and accurately guided into the chain locator so that the free ends align. A pin is inserted by an ROV to interconnect the two chains. After the chains are interconnected, the combined mooring chain is tensioned so as to be withdrawn from the chain locator.

U.S. Pat. No. 7,134,268, issued on Nov. 14, 2006 to G. Siappas, describes a shackle assembly and a method for installing and/or releasing the shackle assembly subsea. The shackle assembly includes first and second plates mounted on either side of a shackle body eyelet and a shackle pin mounting assembly for use in mounting a shackle pin using a shackle pin pulling tool.

It is an object of the present invention to provide a shackle apparatus which facilitates the ability to lift heavy loads from a subsea location to the surface of the water.

It is another object of the present invention to provide to a shackle apparatus whereby the pin of the shackle apparatus can be easily installed by using a remotely operated vehicle (ROV).

It is a further object of the present invention to provide a shackle apparatus having a pin that can be easily guided through the eyelets of the shackle body by a remotely operated vehicle.

It is still another object of the present invention to provide a shackle apparatus that has a pin that can be guided into position by an ROV and then locked into position after being pushed a desired distance through the eyelets of the legs of the shackle body.

It is still another object of the present invention to provide a shackle apparatus which is easy to use, relatively inexpensive and easy to manufacture.

These and other objects and advantages of the present invention will become apparent from a reading of the attached specification and appended claims.

BRIEF SUMMARY OF THE INVENTION

The present invention is an apparatus that comprises a shackle body having a first leg and a second leg in spaced relationship to each other, a pin removably mounted into the shackle body through the first and second eyelets associated with respective first and second legs of the shackle body, at least one latch extending radially outwardly of the pin and residing adjacent to the first leg of the shackle body, and a stop surface extending from the pin and positioned adjacent the second leg of the shackle body.

In the present invention, the pin has a generally pointed end at one end thereof. The generally pointed end extends outwardly of the first leg of the shackle body. A grippable member extends outwardly of an end of the pin and is positioned at the end of the pin opposite the latch.

In the present invention, the latch includes a first latch extending radially outwardly of the pin on one side of the pin and a second latch extending radially outwardly of the pin on an opposite side of the pin. The pin has a first channel formed on one side of the pin and a second channel formed on the opposite side of the pin. The first latch is mounted in the first channel. The second latch is mounted in the second channel. The pin has a passageway extending radially through the pin. The passageway has one end opening to the first channel and an opposite end opening to the second channel. A spring is positioned in this passageway. The spring has a first end resiliently urging the first latch outwardly and a second end resiliently urging the second latch outwardly. The first latch is pivotally mounted to the first channel. The second latch is pivotally mounted in the second channel. Each of the first and second latches has an end opposite the pivotal mounting that resides adjacent the shackle body.

The stop surface includes a flange surface extending radially outwardly of the pin. This flange surface is circular and has an outer diameter greater than a diameter of the eyelet of the second leg of the shackle body. A spring member extends around the pin and has an end juxtaposed against the flange surface. This spring member has an opposite end residing against the second leg.

In the present invention, a line is connected to the shackle body and extends toward a surface of a body of water. A lifting means is positioned on the body of water and is operatively connected to the line. The lifting means serves to apply a force to the line so as to lift the subsea object. The subsea object has at least one padeye formed thereon. This padeye has a hole extending therethrough. The shackle body has the first leg positioned one side of the padeye and the second leg positioned on the opposite side of the padeye. The pin extends through the first eyelet, through the hole of the padeye, and through the second eyelet.

A remotely operated vehicle has an arm extending therefrom. This arm releasably receives the grippable member of the pin. The arm of the ROV is movable so as to cause the pin to enter the first and second eyelets. Another arm of the remotely operated vehicle can grasp the shackle so as to properly position the shackle such that the legs are on opposite sides of the padeye.

DETAILED DESCRIPTION OF THE INVENTION

Figure 1:
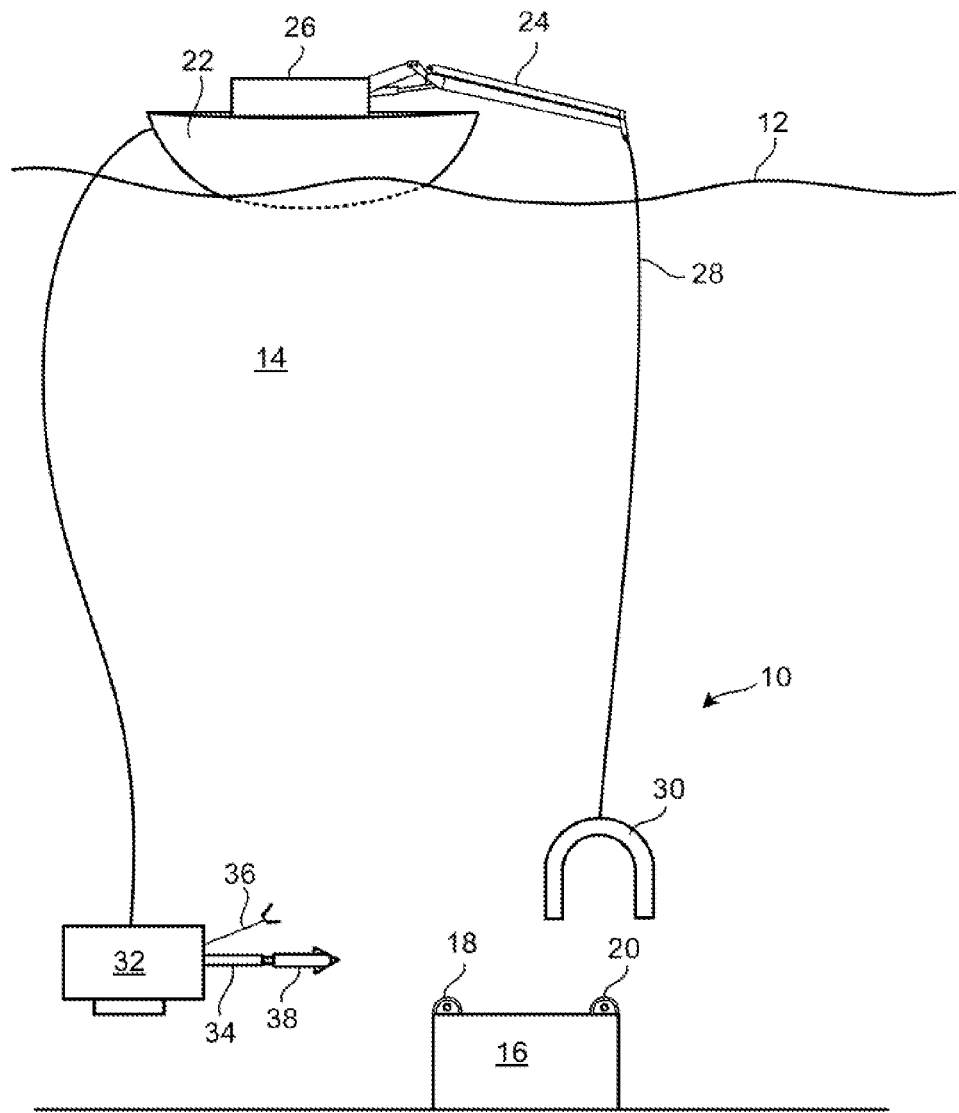
FIG. 1 is a diagrammatic illustration showing the installation of the shackle assembly of the present invention upon a subsea object.

Referring to FIG. 1, there is shown a diagrammatic illustration of the system 10 of the present invention for facilitating the ability to lift large subsea objects to the surface 12 of a body of water 14. As can be seen in FIG. 1, there is a subsea object 16. The subsea object 16 can have a weight of greater than three hundred tons. The subsea object 16 has padeyes 18 and 20 secured to a top surface thereof. A ship 22 floats on the surface 12 of the body of water 14. Ship 12 includes a crane arm 24 with a winch drum 26 connected to a line 28. The line 28 extends over the crane arm 24 and downwardly through the body of water 14. A shackle 30 is affixed to the end of the line 28. Shackle 30 has a first leg and a second leg in spaced relationship around a generally curved body. The first leg has a first eyelet formed therein. The second leg has a second eyelet formed therein. The line 24 can be manipulated, along with the shackle body 30, so as to be placed in proximity at least one of the padeyes 18 and 20.

An ROV 32 is remotely operated from the ship 22. The ROV 32 has a first arm 34 and a second arm 36 extending therefrom. The first arm 34 has a pin 38 gripped therein. Pin 38 has a configuration of the pin described hereinafter. The arm 36 has a gripper end extending from the ROV. The gripper end of arm 36 can be utilized so as to grasp the shackle body 30 and to manipulate the shackle body 30 such that the legs of the shackle body 30 are positioned on opposite sides of at least one of the padeyes 18 and 20.

Once the shackle body 30 is manipulated into a proper position, the arm 34 can be utilized so as to cause the pin 38 to enter through the eyelets of the legs of shackle body 30 and through the hole in the selected padeye 18 and 20. The pin 38 can then be released so that a pinned connection of the shackle body 30 to the padeye is achieved. Once this is achieved, the winch drum 26 can be actuated so as to cause the crane arm 24 to lift the line 28 and to cause the object 16 to be delivered to the surface 12 of the body of water 14. The ROV 32 can be manipulated so that a separate shackle body 30 can be installed onto each of the padeyes of the object 16.

Figure 2:
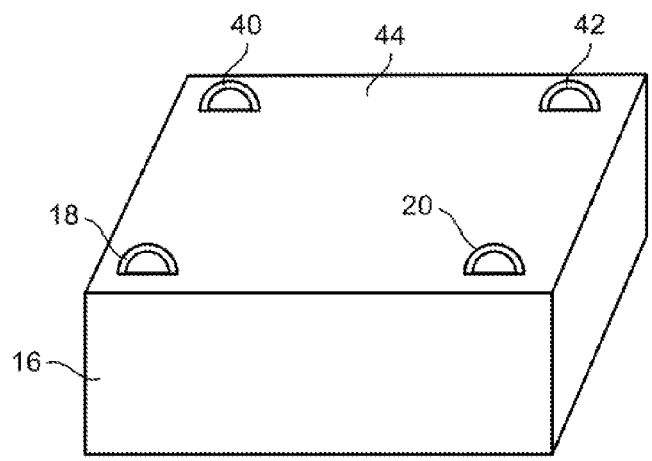
FIG. 2 is a perspective view showing the subsea object.

FIG. 2 is an isolated view of the object 16. As can be seen, the object 16 has a relatively large size. Ultimately, the object 16 can have a weight of twelve hundred tons or more. Padeyes 18, 20, 40 and 42 are formed on the top surface 44 of the object 16. In keeping with the system 10, separate shackle bodies 30 can be applied to each of the padeyes 18, 20, 40 and 42. As such, the lifting force can be distributed over four separate areas so as to maximize the ability to lift the object 16 to the surface of the body of water. The present invention provides an easy technique whereby the shackle bodies can be installed properly into the holes of the separate padeyes.

Figure 3:
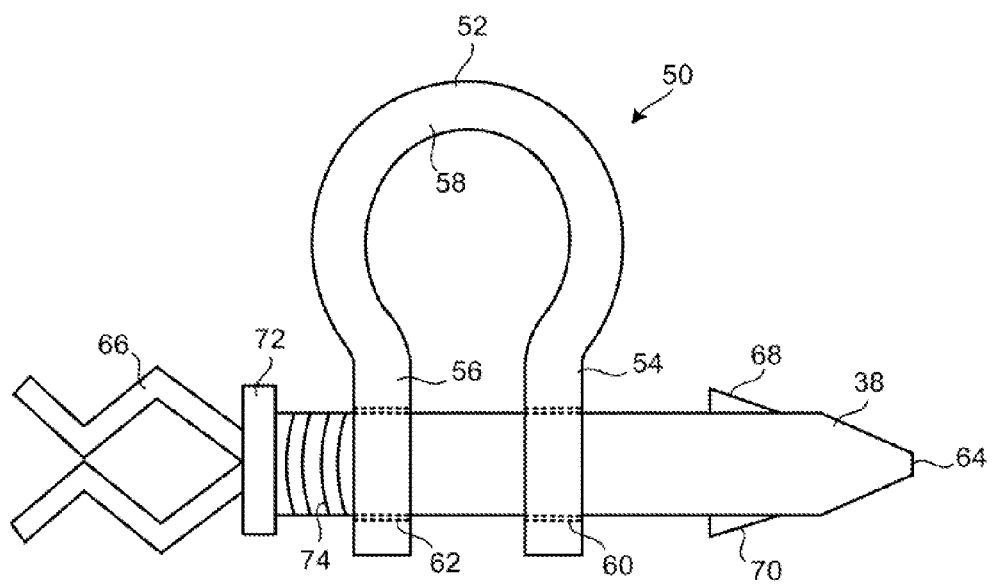
FIG. 3 is a side elevational view showing the pin as installed in the shackle body of the shackle apparatus of the present invention.

FIG. 3 shows the shackle apparatus 50 of the present invention. In FIG. 3, it can be seen that the shackle apparatus 50 has a shackle body 52 having a first leg 54 and a second leg extending from curved body portion 58. The legs 54 and 56 extend in generally spaced parallel relationship to each other. The first leg 54 has a first eyelet 60 formed therethrough. The second leg 56 has a second eyelet 62 formed therethrough.

The pin 38 is installed through the eyelet 60 and 62 of respective legs 54 and 56. As can be seen, the pin 38 has a pointed end 64 at one end thereof. A grippable member 66 is formed at the opposite end of the pin 38. The grippable member 66 is of a configuration such that the arms 34 and 36 of the ROV 32 can easily grip the pin 38 for the purposes of installation.

The pin 38 includes a first latch 68 extending outwardly on one side of the pin 38 and a second latch 70 extending outwardly on an opposite side of the pin 38. Latches 68 and 70 have a wide surface positioned adjacent to the first leg 54. Latches 68 and 70 are resiliently urged outwardly after the pointed end 64 of the pin 38 passes through the eyelet 62 and 60. As such, the outward orientation of the latches 68 and 70 will prevent the pin 38 from being dislodged from the legs 54 and 56 of shackle apparatus 50.

The pin 38 has a body which extends in the space between the legs 56 and 54. A stop member 72 is located at the end of the pin 38 adjacent to the grippable member 66. The stop member 72 is a circular flange member that has a diameter that is greater than diameter of the eyelet 62. A spring member 74 is interposed between the stop member 72 and the surface of the leg 56. Spring 74 provides a resilient cushioning effect when the pin 38 is installed through the eyelets 62 and 60 of the shackle body 52. The spring 74 also urges the wide end of the latches 68 and 70 against the outer surface of the first leg 54. As such, when the pin 38 is installed through the eyelet 62 and 60 of legs 56 and 54 of shackle apparatus 50, they can provide a secure engagement with the particular padeye placed between legs 54 and 56. After the object 16 has been transported to the surface and secured, the pin 38 can be removed from the legs 54 and 56 of the shackle body 52 and used for other applications.

Figure 4:
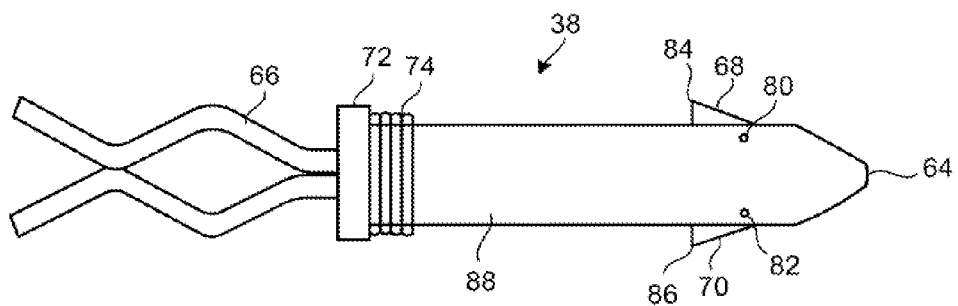
FIG. 4 is isolated side elevational view showing the pin as used in the shackle apparatus of the present invention.

FIG. 4 shows an isolated view of the pin 38. It can be seen that the pin 38 has a generally curved pointed end 64 at one end thereof. The grippable member 66 is located at an opposite end thereof. Latches 68 and 70 are connected to the respective sides of the pin 38 by pivotal mounts 80 and 82, respectively. As will be described hereinafter, a spring urges the wide ends 84 and 86 outwardly so as to provide an abutment surface against which the wide ends 84 and 86 will reside against the outer surface of the leg 54 of shackle body 52. FIG. 4 also shows that the stop member 72 has a wider diameter than the body 88 of the pin 38. Spring 74 has an end juxtaposed against the stop member 72 and extends outwardly therefrom along the body 88 of pin 38.

Figure 5:
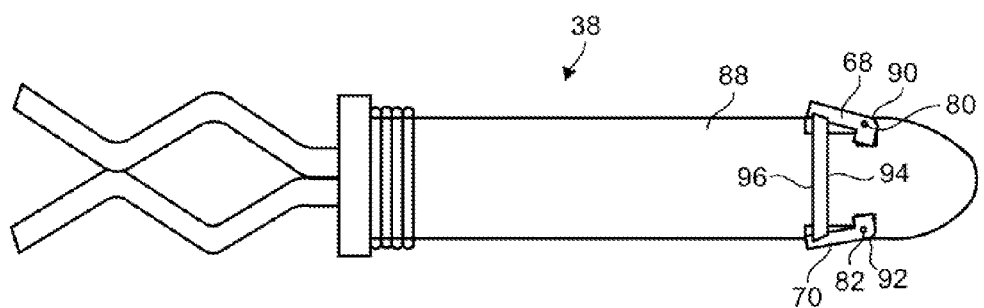
FIG. 5 is a partially cross-sectional view showing the latch mechanism of the pin of the shackle apparatus of the present invention.

FIG. 5 shows the pin 38 and, in particular, the interior structure of the present invention 38. As can be seen, there is a channel 90 formed on one side of the body 88 of pin 38. A second channel 92 is formed on the opposite side of the body 88 of pin 38. The first latch 68 is pivotally mounted at 80 within the channel 90. Similarly, the latch 70 is pivotally mounted at 82 within the channel 92. A passageway 94 extends radially through the body 88 of pin 38. A spring 96 is positioned in this passageway 98. Spring 96 has one end connected to the latch 68 so as to resiliently urge the latch 68 outwardly. This spring 96 has an opposite end connected to the latch 70 so as to resiliently urge the latch 70 outwardly.

In normal use, when the pin 38 passes through the eyelets 60 and 62 of respective legs 54 and 56 of shackle body 52, the latches 68 and 70 will cause the spring 96 to compress such that the outer surfaces of the latches 68 and 70 will be flush with the outer surface of the body 88 of pin 38. Once the end of the body 88 of pin 38 passes outwardly of the eyelet 60, the spring 96 urges the latches 68 and 70 outwardly such that the wide surface 84 and 86 of the latches 68 and 70, respectively, will provide an abutment surface against the first leg 54 and prevent the pin 38 from releasing from the shackle body 52.

Figure 6:
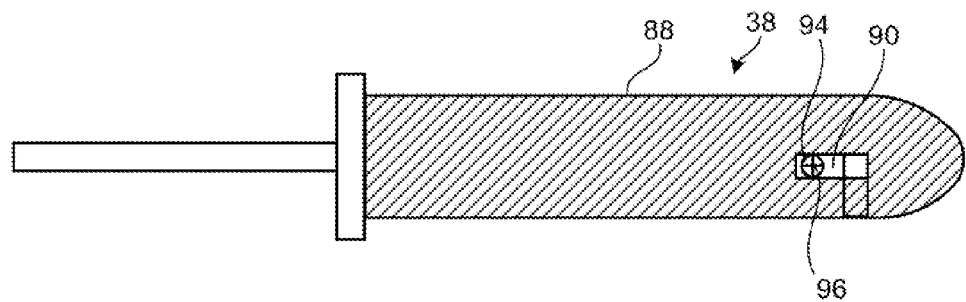
FIG. 6 is a cross-sectional side view of the pin of the shackle apparatus of the present invention.

FIG. 6 shows a cross-sectional view of the pin 38. It can be seen that the body 88 is entirely solid so as to provide a strong structure for the lifting of heavy objects from the subsea surface. The first channel 90 is formed in the top surface of the body 88 of pin 38. Passageway 94 along spring 96 extends generally transversely to the channel 90.

Figure 7:
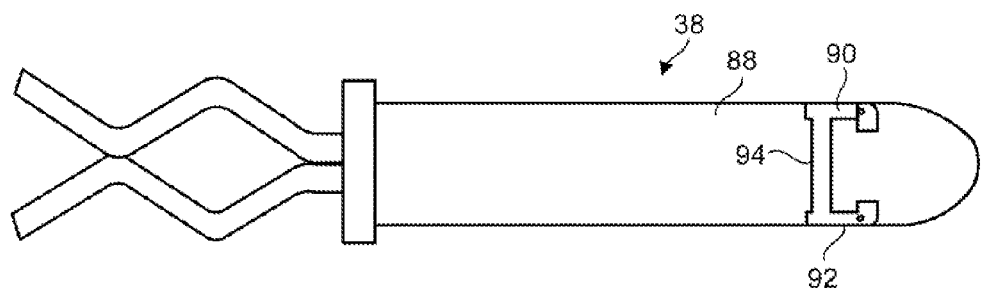
FIG. 7 is a cross-sectional plan view of the pin of the shackle apparatus of the present invention.

FIG. 7 shows another cross-sectional view of the pin 38. Pin 38 is illustrated as having the first channel 90 at a top side thereof and a second channel 92 at a bottom side thereof. Passageway 94 extends radially through the body 88 of the pin 38 so as to have one end opening to the channel 90 and an opposite end opening to the channel 92.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A lifting system comprising:

an object having at least one padeye affixed thereon, said padeye having a hole extending therethrough;

a shackle body having a first leg and a second leg in spaced relationship to each other, said first leg having a first eyelet formed therein, said second leg having a second eyelet formed therein, said first leg positioned on one side of said padeye, said second leg positioned on an opposite side of said padeye;

a pin extending through said first eyelet and through said hole of said padeye and through said second eyelet, said pin being solid and having a pointed end integrally formed therewith, said pointed end extending outwardly of said first leg of said shackle body, said pin having a first channel formed into one side of said body and a second channel formed into an opposite side of said body, said first channel having an inner wall spaced from and separate from an inner wall of said second channel;

a first latch received in said first channel and having a portion extending radially outwardly of said pin, said first latch residing adjacent said first leg of said shackle body;

a second latch received in said second channel and having a portion extending radially outwardly of said pin, said second latch residing adjacent said second leg of said shackle body;

a stop surface extending from said pin and positioned adjacent said second leg of said shackle body;

a remotely-operated vehicle having an arm extending therefrom;

a grippable member extending outwardly of an end of said pin, said grippable member having a prismatic surface, said prismatic surface suitable for grasping and manipulation by the remotely-operated vehicle, said pin having a passageway formed in and extending diametrically therethrough, said passageway having one end opening to said first channel and an opposite end opening to said second channel; and a spring positioned in said passageway, said spring having a first end resiliently urging said first latch outwardly and a second end resiliently urging said second latch outwardly.

2. The lifting system of claim 1, further comprising:

a line connected to said shackle body and extending toward a surface of a body of water; and a lifting means positioned on the body of water and operatively connected to said line, said lifting means for applying a force to said line so as to lift said object.

3. The system of claim 1, said object having a weight in excess of three tons.

4. The system of claim 1, said stop surface comprising: a flange surface extending radially outwardly of said pin, said flange surface having an outer diameter greater than a diameter of said second eyelet; and a spring member extending around said pin and having an end juxtaposed against said flange surface, said spring member having an opposite end residing against said second leg.

* * * * *